June 18, 1963 H. J. MORAN Re. 25,398

INFLATABLE LIFE PRESERVER

Original Filed April 30, 1957 3 Sheets-Sheet 1

INVENTOR.
HAROLD J. MORAN

BY

Curtis, Morris & Safford
ATTORNEYS

June 18, 1963 H. J. MORAN Re. 25,398

INFLATABLE LIFE PRESERVER

Original Filed April 30, 1957 3 Sheets-Sheet 2

INVENTOR.
HAROLD J. MORAN
BY
Curtis, Morris & Safford
ATTORNEYS

INFLATABLE LIFE PRESERVER

Original Filed April 30, 1957 3 Sheets-Sheet 3

INVENTOR.
HAROLD J. MORAN
BY
Curtis, Morris & Safford
ATTORNEYS

United States Patent Office

Re. 25,398
Reissued June 18, 1963

25,398

INFLATABLE LIFE PRESERVER

Harold J. Moran, Trenton, N.J., assignor to Switlik Parachute Company, Inc., Trenton, N.J.

Original No. 2,886,835, dated May 19, 1959, Ser. No. 656,139, Apr. 30, 1957. Application for reissue May 16, 1961, Ser. No. 119,010
18 Claims. (Cl. 9—340)

Matter enclosed in heavy brackets [ ] appears in the original patent but forms no part of this reissue specification; matter printed in italics indicates the additions made by reissue.

The present invention relates to life preservers and more particularly to a life preserver adapted to be worn in collapsed condition and which may be inflated when required.

A common type of life preserver used by aviators and naval personnel extends around the neck and over the chest of the wearer. Such life preservers are quite bulky, are apt to interfere with other equipment worn by aviators and require a harness extending under the arms to attach it to the body. Also, the inflatable unit of such preservers *is* [are] enclosed in an envelope of complicated construction to adapt both the chest and neck portions to be readily opened. Furthermore, such life preservers usually have a single gas cell, which, if faulty, provides no protection to the wearer.

Life preservers also have been proposed having an inflatable unit enclosed in a belt adapted to be worn around the waist of the wearer. Such previously proposed belt type life preservers do not fit comfortably on the wearer, usually have a single gas cell and are of a complicated construction which is expensive to manufacture. Some of the belt type life preservers also depend upon a harness to attach it to the body of the wearer.

One of the objects of the present invention is to provide a belt type life preserver of improved construction which is comfortable to wear and reliable in operation.

Another object is to provide a belt type life preserver which is adjustable to adapt it to snugly fit any individual.

Another object is to provide a life preserver of the type indicated in which the inflatable unit is secured around the waist of the wearer independently of the enclosing envelope forming the belt.

Another object is to provide a life preserver of the type indicated in which the envelope is so constructed as to insure quick release of the gas cell when inflated.

Still another object is to provide a belt type life preserver of the type indicated which is light weight, of simple and compact construction and adapted for economical manufacture.

These and other objects will become more apparent from the following description and drawings in which like reference characters denote like parts throughout the several views. It is to be expressly understood, however, that the drawings are for the purpose of illustration only and are not a definition of the limitations of the invention, reference being had for this purpose to the appended claims.

Figure 1:
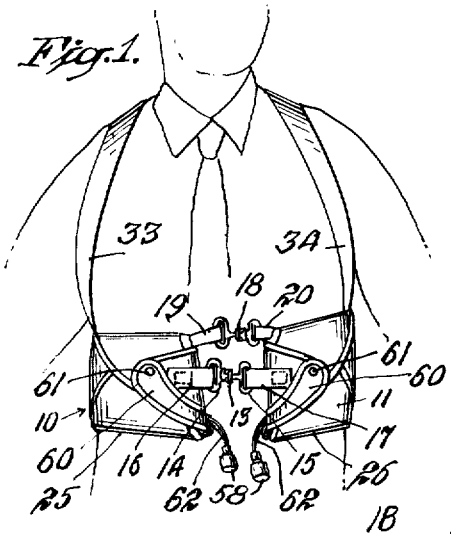
FIGURE 1 is a perspective view of a life preserver embodying the novel features of the present invention and shown attached around the waist of the wearer.
Figure 2:
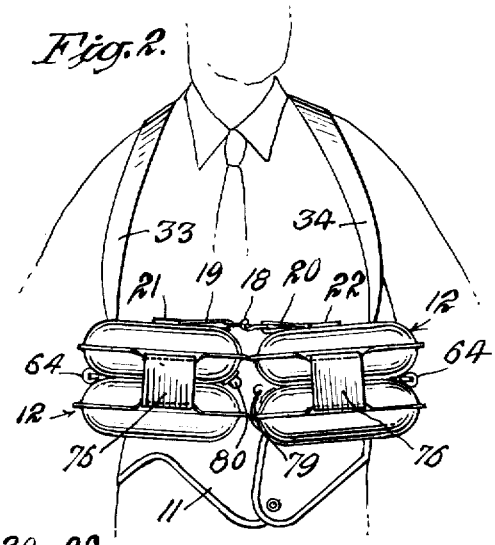
FIGURE 2 is a view similar to FIGURE 1 showing the same life preserver when inflated.
Figure 9:
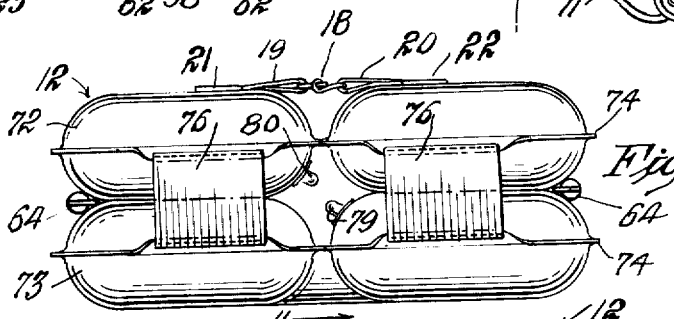
FIGURE 9 is a front elevational view of the inflated unit showing the separate gas cells and connecting webs to form an integral unit.

Referring now to FIGURES 1 and 2 of the drawings, the life preserver 10 of the present invention is shown in the form of a belt adapted to be worn around the waist of a person. Belt 10 comprises an outer sheath or envelope 11 of a flexible material such as canvas, or the like, and a collapsed inflatable unit 12 enclosed therein. The inflatable unit 12 is formed to provide a plurality of gas cells, later to be described in detail, and is composed of a suitable thin, impervious, lightweight material such as a laminate of rubber and nylon fabric. Such material is highly impervious to gas and water and is sufficiently flexible to adapt it to be folded into a very small space in the enclosing envelope 11.

As shown in FIGURE 1, the flexible envelope 11 with the inflatable unit 12 packed therein is wrapped around the waist of the wearer and the ends attached by an interlocking fastener 13. In the illustrated embodiment, the interlocking fastener 13 comprises a slotted hook 14 attached to one end of the belt and a T-shaped tongue 15 attached to the other end of the belt. The shank of the T-shaped tongue 15 projects through the slot in the hook 14 with the lateral projections at the end of the shank engaging hook 14 at the sides of the slot. Such an interlocking fastener 13 cannot be released except intentionally by turning the T-shaped tongue at right angles to the slot in the hook 14. The slotted hook 14 and T-shaped tongue 15 of the interlocking fastener 13 are attached to the opposite ends of the envelope 11 forming the belt by means of short straps 16 and 17. Straps 16 and 17 may be formed of a suitable fabric such as a canvas webbing with each having one end stitched to an end of the envelope 11 and the opposite end looped through an eyelet in the slotted hook 14 or T-shaped tongue 15, respectively, and stitched to itself.

As shown in FIGURE 2, the inflatable unit 12 also is attached around the waist of the wearer independently of the envelope 11 by an interlocking fastener 18. The interlocking fastener 18 is identical with the fastener 13 having a slotted hook and T-shaped tongue attached to the ends of the inflatable unit by means of straps 19 and 20. One end of each of the straps 19 and 20 are stitched to fabric patches 21 and 22 which, in turn, are attached to the fabric of the inflatable unit 12 by means of suitable cement. The opposite ends of the straps 19 and 20 have loops attached to eyelets in the interlocking hook and tongue elements of the fastener 18 in the same manner as explained with respect to the fastener 13.

Referring to FIGURES 3 to 8 of the drawings, the envelope 11 forming the belt comprises separate end sections 25 and 26 and an intermediate section 27. The ends of the intermediate section extend into the adjacent ends of the end sections 25 and 26 in which they are adapted to telescope. The length of the belt may be adjusted to snugly fit the waist of any individual by means of a strap 28. Adjusting strap 28 has one end attached to the end section 25 as by stitching it thereto and extends through a loop 29 on the intermediate section 27 and through a buckle 30 attached to end section 26 by a strap 31. Buckle 30 has a transverse bar around which the free end of the adjusting strap 28 bends to form a bight therein. Thus, by drawing the free end of the adjusting strap 28 through buckle 30 the length of the belt may be adjusted to adapt it to the waist of any individual with the ends of the intermediate section *27* [28] telescoping in the end sections 25 and 26 to permit such adjustment.

A suspender harness 32 also may be provided to distribute part of the weight of the belt to the shoulders of the wearer. The suspender harness comprises two straps 33 and 34 having one of their ends attached to the inside face of the envelope of one end section 25 and their opposite ends attached to the inside face of the envelope of the other end section 26 by stitching them thereto. The straps 33 and 34 extend upwardly over the shoulders and cross each other at the back of the wearer. A slotted guide plate 35 is provided at the back having slots therein through which the straps 33 and 34 extend at right angles to each other to retain the straps in their proper position.

End sections 25 and 26 of the envelope 11 are of identical construction in reverse order and each comprises an inner fabric panel 38 adapted to lie adjacent the body and an outer fabric panel 39 overlying the inner panel. As shown in detail at the right-hand side of FIGURE 6, the inner panel 38 has a lower edge 40 extending horizontally and an upper edge 41 inclined upwardly relatively to the lower edge from its inner or left-hand end toward its outer or right-hand end. At its outer or right-hand end, the panel 38 is provided with outwardly projecting lower and upper wing flaps 42 and 43 and an end wing flap 44. A fabric loop or band 53 also is attached to the inner panel adjacent its upper edge which encircles the inflatable unit 12 *to* attach it to the envelope 11.

The outer panel 39 is of the same general contour as the inner portion of the panel 38 and has a lower horizontal edge 45 extending along the lower horizontal edge 40 of the inner panel. The overlapping lower edge portions 40 and 45 of the inner and outer panels 38 and 39 are stitched to each other. The upper edge of outer panel 39 also is tapered outwardly and projects beyond the tapered upper edge 41 of the inner panel to form a flap 46 adapted to fold over the upper edge of the inner panel. Thus, the upper edge of the outer panel 39 overlies the upper edge of the inner panel 38 to prevent separation of the edges of the panels by an outside force such as the flow of air during a free fall in space by wearer. Outer panel 39 also has an end portion 47 projecting beyond the lower edge 45 and flap 46. Thus, the end sections 25 and 26 are adapted to unfold from their closed position illustrated in FIGURES 3 and 4, to the open position illustrated at the right-hand side of FIGURE 6.

The end sections 25 and 26 are adapted to be detachably fastened in closed position to enclose the inflatable unit 12. For this purpose the outwardly projecting end portion 47 of the outer panel 39 is provided with a fabric loop 48 adapted to project through aligned eyelets 49, 50 and 51 on the wing flaps 42, 43 and 44 when the latter are folded successively one over the other to close the open end thereof. The upper edge portions of the inner and outer panels 38 and 39 also are provided with aligned quick detachable snap fasteners 52 adapted to be released by an expansive pressure between the panels. As will be observed by reference to FIGURE 6, the straps 19 and 20 attached to the ends of the inflatable unit 12 extend outwardly through the end sections 25 and 26 of envelope 11 between the folded upper and end wing flaps 43 and 44. As previously stated, the straps 19 and 20 connect the ends of inflatable unit 12 around the waist of the wearer by means of the interlocking fastener 18 independently of the interlocking fastener 13 for connecting the ends of the envelope or belt.

Figure 5:
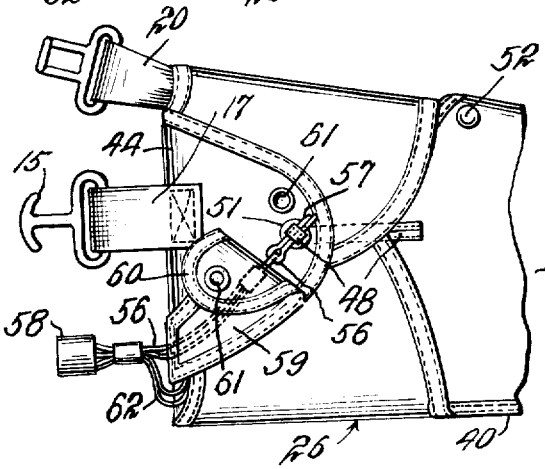
FIGURE 5 is an enlarged view of one end section of the belt showing the pull cord for releasing the flaps to initiate opening of the envelope.
Figure 6:
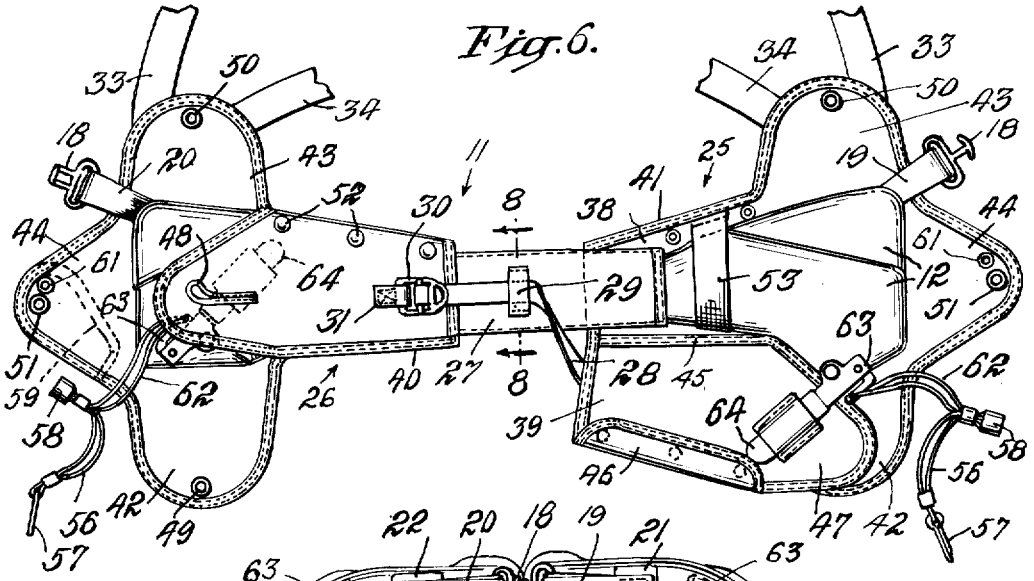
FIGURE 6 is a view similar to FIGURE 4 and showing the manner in which the flaps and envelope unfold to release the inflatable unit of the preserver.
Figure 7:
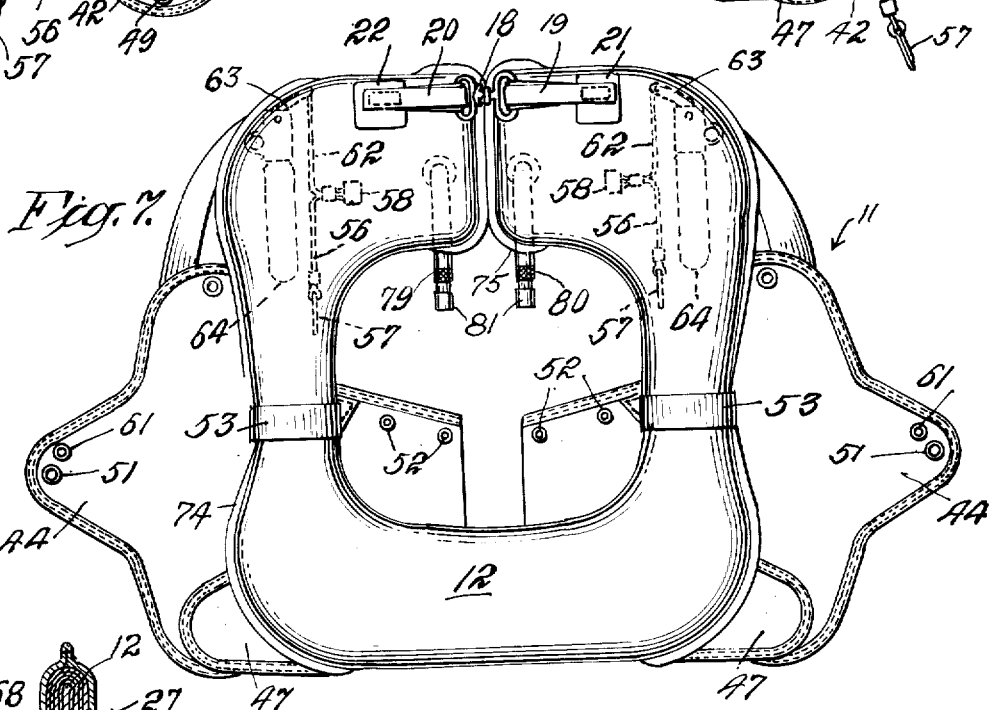
FIGURE 7 is a plan view of the gas cell produced when the unit is inflated.

Each of the end sections 25 and 26 is opened by an individual pull *cord* [card] 56 attached to a pin 57 extending through the end of the loop 48 and overlying the outer end flap 44, see FIGURE 5. Each pull cord 56 extends along the top of the end wing flap 44 of its end section 25 or 26 and has a knob 58 at its end to adapt it to be manually pulled. A fabric patch 59 is stitched to the outside face of the end wing flap 44 to provide a guideway for the pull cord 56 and protect it from accidental operation. The end portion 60 of the patch 59 constitutes an outwardly foldable flap overlying the pin 57 and is adapted to be connected to the end wing flap by a detachable snap fastener 61.

A second pull cord 62 extends from each knob 58 and is attached to a valve 63 on a cylinder 64 containing a liquid such as carbon dioxide. Valve 63 controls the flow of liquid from the cylinder 64 at high pressure to the interior of unit 12 at low pressure where it expands into a gas to inflate the unit. Thus, the manual pulling of the knob 58 on either end section 25 or 26 of the envelope 11 withdraws the pull cord 56 and pin 57 to release the wing flaps 42, 43 and 44 of its end section and simultaneously actuate the valve [36] *63* through the pull cord 62 to inflate one gas cell of the inflatable unit 12. Thus, inflation of the unit 12 opens the released flap 42, 43 and 44 of the end section and also produces an expansive pressure between the inner and outer panels 38 and 39. Such expansive pressure between the panels automatically releases the snap fasteners 52 to open the end section of the envelope. The inwardly tapered form of the panels 38 and 39 further augments the expansive force to release the snap fasteners 52 and rip the envelope open to release the unit.

Figure 8:
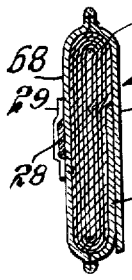
FIGURE 8 is a transverse sectional view taken on line 8—8 of FIGURE 6 to show the folded panels of the intermediate section of the envelope forming the belt.

As shown in FIGURE 8, the intermediate section 27 is formed by an outer panel 68, an intermediate panel 69 stitched to the bottom edge of the outer panel and projecting upwardly and an inner panel 70 having its upper edge stitched to the upper edge of the outer panel 68 and projecting downwardly and overlapping the intermediate panel 69. Thus, the intermediate section 27 constitutes a connecting tube between the end sections 25 and 26 for enclosing the intermediate portion of the inflatable unit and is quickly opened when the unit is inflated.

As shown in FIGURES 2, 9, 10 and 11, the inflatable unit 12 has separate upper and lower gas cells 72 and 73. Each gas cell 72 and 73 comprises a closed bag conforming to the waist of the wearer and is formed by overlapping flat sheets of the laminate rubber and nylon material. The edge portions of the sheets are sealed to each other by a suitable rubber cement, or the like, and form inner and outer fins 74 and 75. When inflated, each cell 72 and 73 forms a torus of generally rectangular shape surrounding the waist of the wearer. As will be observed by reference to FIGURE 7, the front portion is slightly wider than the rear portion while the sides which underlie the arms of the wearer are of much narrower width. As also will be observed from FIGURE 7, the forward ends of the cell 72 are attached to each other by the interlocking fastener 18. The cylinders 64 containing the expansible medium carbon dioxide are located between the cells 72 and 73 and each cylinder is connected to one of the gas cells 72 or 73 by a suitable gas tight connection. Thus, if one of the cells 72 or 73 should be defective the other cell would be sufficient to maintain the person afloat.

Figure 10:
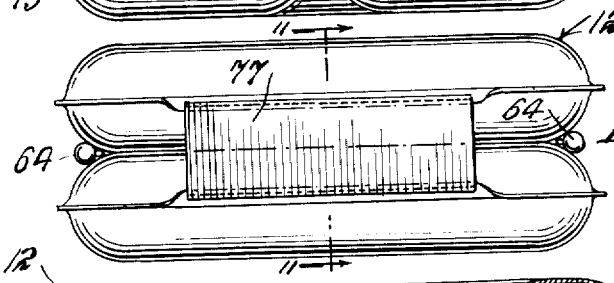
FIGURE 10 is a rear elevational view of the inflated unit to show the connecting web between the gas cells.
Figure 12:
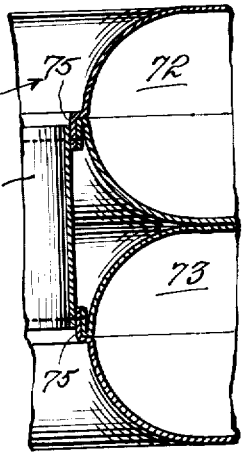
FIGURE 12 is an enlarged sectional view to show the manner of attaching the connecting webs to the separate gas cells.
Figure 11:
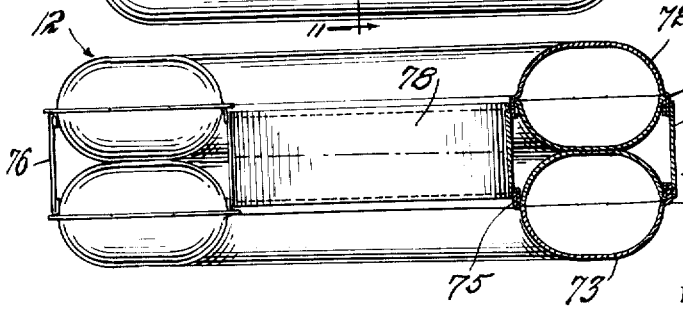
FIGURE 11 is a transverse sectional view taken on line 11—11 of FIGURE 10 to show the connecting web between the gas cells at the interior of the unit.
Figure 3:
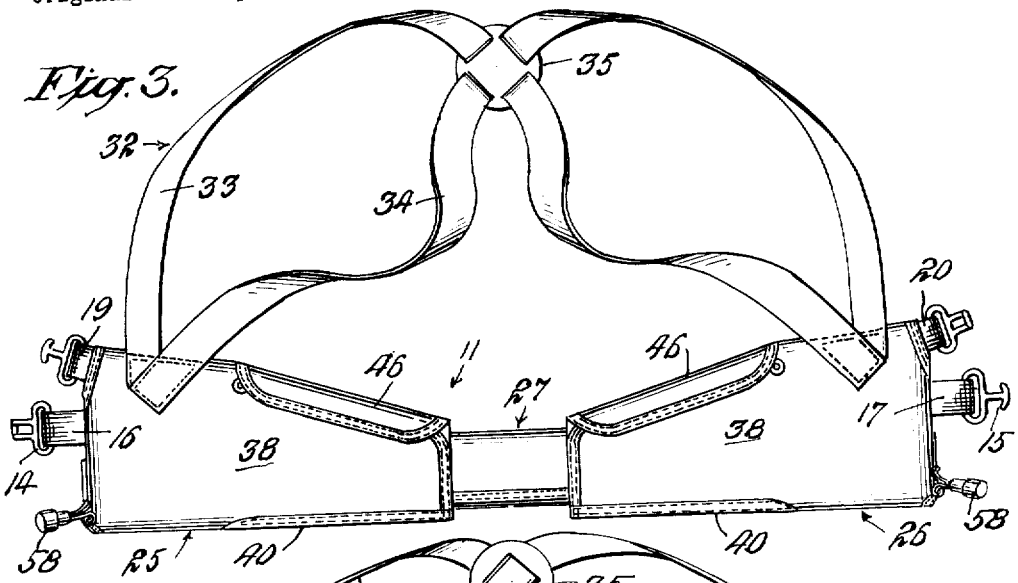
FIGURE 3 is an elevational view of the belt shown in extended position to illustrate the three sections of the belt at the side engaging the body and the interlocking fasteners for attaching the belt and inflatable unit to the body.

As shown in FIGURES 9 to 12, the two separate gas cells 72 and 73 are attached to each other in an integral unit by means of connecting webs 76, 77 and 78 of a suitable material such as a nylon fabric. Webs 76 are of relatively narrow width and connected between the gas cells 72 and 73 at the front of the unit, see FIGURE 9. Each connecting web 76 has its upper and lower ends stitched to the fins 74 on the upper and lower cells 72 and 73, respectively. The connecting web 77 is located at the rear of the gas cells 72 and 73 and has its upper and lower ends stitched to the fins 74 as shown in FIGURE 10. Web 77 is longer than the webs 76 and extends throughout a substantial distance along the rear portion of the gas cells 72 and 73. Web 78 is located at the interior of the gas cells 72 and 73 and has its upper and lower edges attached to the fins 75 of the upper and lower cells, respectively, as by stitching and extends throughout the entire periphery of the gas cells, as shown in FIGURE 11. The ends of each of the webs 76, 77 and 78 are stitched to the fins 74 and 75 of the separate gas cells 72 and 73 in the manner illustrated in detail in FIGURE 12 for the inner web 78. Thus, the webs 76, 77 and 78 extending between the upper and lower gas cells 72 and 73 at the front and back on the outer periphery and around the entire inner periphery retain the cells in an integral unit.

In addition to the cylinder 64 and valve member 63, each gas cell 72 and 73 has a tube 79 and 80, respectively, sealed thereto to adapt the gas cell to be inflated by blowing through the tube. The outer end of each tube 79 and 80 is provided with a valve 81 to seal the tube or open the tube to adapt air to be blown therein. A preferred form of the life preserver having now been described in detail, the operation of the life preserver is explained below.

To assemble the life preserver into a belt, the material of the collapsed inflatable unit 12 is folded in a compact space within the opened end sections 25 and 26 of the envelope 11 and between the overlapping panels 68, 69 and 70 of the intermediate section 27. The outer panels 39 of the end sections 25 and 26 are then folded over the material of the inflatable unit 12 with flap 46 at its upper edge overlying the upper edge of the inner panel 38. The opened edges of the end sections 25 and 26 are then closed by pressing the aligned snap fasteners 52 into engagement with each other. The lower, upper and end wing flaps 42, 43 and 44 of each end section 25 and 26 then are folded inwardly one over the other, in succession to close the end of the end sections and the loops 48 on the outer panel 39 are drawn through the aligned eyelets 49, 50 and 51 in the wing flaps. Pins 57 are then inserted through the end of loops 48 to retain the flaps folded to complete the assembly.

Figure 4:
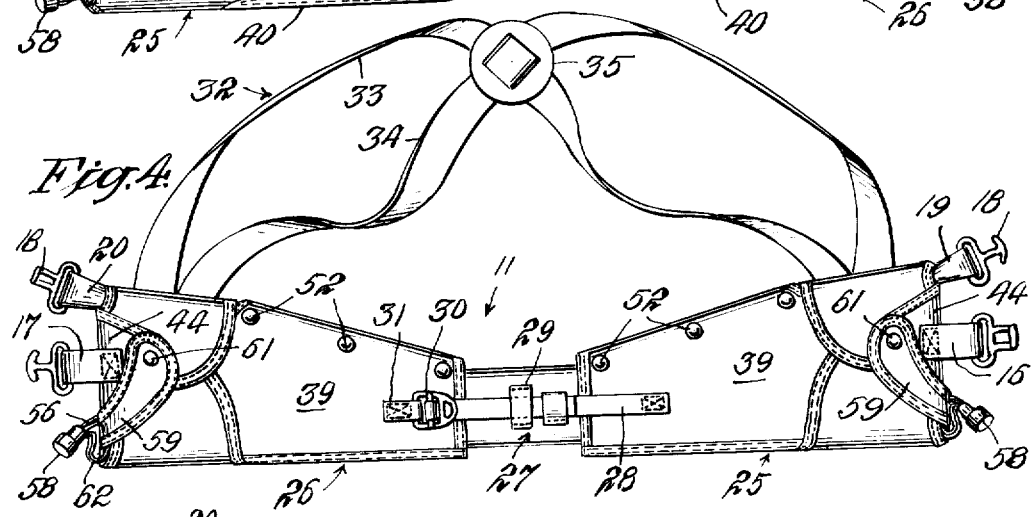
FIGURE 4 is a view similar to FIGURE 3 but reversed to show the exterior of the belt and illustrating the means for adjusting its length.

Adjusting strap 28 attached to end section 26 is then passed through the loop 29 in the intermediate section 27 and slide buckle 30 on end section 25 to attach the three sections together to form a belt as shown in FIGURE 4. The life preserver 10 is then applied to the person by inserting his arms between the straps 33 and 34 of the shoulder harness at either side of the slotted guide plate 35 and the assembled belt is flexed around the waist. If the assembled belt is either too short or too long, it may be adjusted by shortening or lengthening the adjusting strap 28 in the buckle 30. When adjusted to proper length the belt is attached around the waist by inserting the T-shaped tongue of the interlocking fastener 13 through the slotted hook 14 and then turning the tongue ninety degrees to cause it to lock with the hook. Interlocking fastener 18 then is hooked to fasten the inflatable unit 12 around the waist of the wearer independently of the envelope 11.

The life preserver is worn in this fashion until inflation is required. To inflate the gas cells 72 and 73, the knobs 58 depending from each end section 25 and 26 are pulled. Each knob 58 acting through a pull cord 56 withdraws pin 57 from the loops 48 and releases the folded wing flaps 42, 43 and 44 of its end section. Further pulling of the knob 58 actuates the valve member 63 through the pull cord 62 to release the fluid in the cylinder 54 into its respective cells 72 or 73. The expansion of the fluid inflates the cells 72 and 73 and automatically opens the end and intermediate sections 25, 26 and 27 of the belt to form an annular bouyant float around the body of the wearer and under his arms. Thus, the wearer is suspended in the inflated cells which hold him afloat in the water.

While a single embodiment is herein illustrated and described, it will be understood that changes may be made in the construction and arrangement of elements without departing from the spirit or scope of the invention. Therefore, without limitation in this respect, the invention is defined by the following claims.

I claim:

1. A life preserver comprising an elongated envelope of flexible material having terminal ends, open along at least one side and closed by overlapping flaps, quick detachable fastening means at the edges of the flaps for holding the envelope closed, an inflatable unit of a thin impervious material packed in said envelope and so formed as to provide a gas cell, said envelope with the collapsed gas cell packed therein adapted to be applied around the waist of the wearer in the manner of a belt, a fastener having connecting parts attached to the ends of the envelope, and a second fastener having connecting parts attached to the ends of the gas cell and extending through openings in the envelope whereby one fastener attaches the envelope to the wearer and a second fastener attaches the gas cell to the wearer separately of the envelope.

2. A life belt comprising an extensible envelope of a flexible material having end sections and an intermediate section, the ends of the intermediate section projecting into the adjacent ends of the end sections and telescoping therein, said envelope adapted to be wrapped around the waist of the wearer in the manner of a belt, an interlocking fastener having connecting parts attached to adjacent portions of the end sections, means for telescoping the ends of the intermediate section in the end sections to adjust the length of the belt and hold the end sections in adjusted position relative to the intermediate section, an inflatable unit of a thin impervious material packed in said envelope, means for inflating the unit to provide a gas cell, and means for opening each section of the envelope when the unit is inflated.

3. A life belt comprising an envelope of a flexible material having opposed side panels open at one edge, said envelope being widest at its outer ends and gradually tapering to a lesser width intermediate its ends, an inflatable bag of a thin impervious material packed in said envelope, said envelope and bag packed therein adapted to be applied around the waist of the wearer in the manner of a belt, a fastener for attaching the ends of the belt to each other, releasible snap fasteners adjacent the free-edge portions of the opposed panels of the envelope for closing the open edge, means for inflating the bag to form a gas cell, and said tapered contour of the envelope augmenting the expansive force of the inflated bag to release the snap fasteners and open the envelope.

4. A life belt comprising an extensible envelope of a flexible material having end sections and an intermediate section, each end section being widest at its outer end and gradually tapering to a lesser width at its inner end, the opposite ends of the intermediate section telescoping into the narrower ends of the end sections, a fastener having interlocking parts attached to the opposite ends of the respective end sections of the envelope to adapt it to be applied around the waist of the wearer in the manner of a belt, each end section of the envelope having opposed panels connected at one edge and open at its opposite edge, snap fasteners adjacent the free edges of the opposed panels of each end section for closing the open edge of the envelope, an inflatable bag of a thin impervious material packed in said end and intermediate sections of the envelope, a fastener having interlocking parts attached to the end of the inflatable bag and extending through openings in the envelope for attaching the bag to the wearer separately of the envelope, means attached to the end sections of the envelope adjacent the intermediate section for adjusting the length of the belt, and means for inflating the bag to release the snap fasteners and open the envelope.

5. A life preserver in accordance with claim 1 in which the envelope comprises inner and outer panels attached at one edge and open at the other edge, and the detachable fastening means being mounted on the panels adjacent the open edge.

6. A life preserver in accordance with claim 5 in which the outer panel extends beyond and is folded over the edge of the inner panel to prevent air from flowing between the panels and releasing the fastening means during a free fall from an airplane.

7. A life preserver in accordance with claim 2 in which each end section of the envelope has opposed inner and outer panels attached to each other at one edge, detachable snap fasteners in the [side] *said* panels adjacent the opposite edge *thereof* [of the panels], wing flaps and an end flap at the outer end of the inner panel, said flaps being folded one over the other, detachable fastening means for retaining the flaps in overlapping relationship, and [the connecting parts of the] *an interlocking* fastener for attaching the inflatable bag to the person extending outwardly through the envelope between *the* overlapping flaps.

8. A life perserver in accordance with claim 7 in which the detachable fastening means for the wing and end flaps is a loop attached to and projecting from the outer panel through eyelets in the overlying flaps, a pin projecting through the loop to hold the flap folded, and a pull cord attached to the pin for withdrawing the pin to release the folded flaps.

9. A life preserver in accordance with claim 8 in which a patch is provided on the end flap and overlies the pull cord to protect it from accidental operation and provide a guideway through which it may be pulled.

10. A life preserver in accordance with claim 7 in which the separable parts of the fastener for the envelope are attached to the end flaps.

11. A life preserver in accordance with claim 1 in which the inflatable unit is in the form of a tubular bag and a loop on each end portion of the envelope incircling the bag to attach the latter to the envelope.

12. A life preserver in accordance with claim 1 in which the inflatable *unit* [element] comprises two separate gas cells, and individual means for inflating each cell.

13. A life preserver in accordance with claim 12 having a connecting means attaching the inside and outside edges of the separate gas cells, respectively, to each other to hold them together in an integral unit.

14. A life belt in accordance with claim 2 in which the adjusting means comprises straps connected to each of the end sections adjacent the intermediate section, and a buckle on one of the straps through which the other strap may be pulled.

15. A life belt in accordance with claim 2 in which each end section of the envelope comprises opposed panels open at one edge, detachable fasteners for closing the open edges of the end sections, and the intermediate section comprising an outside panel with opposed panels projecting from each edge of the outside panel and folded over each other to form a pocket for enclosing the intermediate portion of the inflatable bag.

16. A life preserver comprising an elongated envelope of flexible material having terminal ends, open along at least one side and closed by overlapping folds, quick detachable fastening means at the edges of the folds for holding the envelope closed, an inflatable unit of a thin impervious material packed in said envelope and formed to provide a gas cell, said envelope with the collapsed gas cell packed therein adapted to be applied around the waist of the wearer in the manner of a belt, connecting parts at the ends of the envelope for fastening it around the waist of the wearer, said envelope having telescoping parts for adjusting the length of the belt, and means for holding the telescoping parts of the envelope in adjusted relationship.

*17. A life preserver comprising an inflatable unit having a plurality of separate superimposed gas cells, each of said cells being composed of a thin, flexible, impervious material and shaped to form a central opening so as to surround the body of the wearer and provide an inner periphery adjacent to and an outer periphery remote from the body of the wearer, means for inflating the individual cells and maintaining the cells inflated independently of each other, and webs connected to and extending between the edges of the adjacent cells at the inner and outer peripheries thereof to connect the plurality of superimposed cells into a single unit and control the expansion of the cells away from each other.*

*18. A life preserver comprising an inflatable unit having a plurality of separate superimposed gas cells shaped to form a central opening to surround the body and provide inner peripheries at the central opening and outer peripheries remote from the inner peripheries, each of said cells comprising superimposed layers of a flexible, impervious material having the adjacent faces at their edges sealed to each other to provide a continuous marginal fin extending around the inner and outer edges, an inner web having its opposite edge portions overlying and attached to the fins of adjacent cells and extending around substantially the entire periphery of the central opening, at least one outer web attached to the fins at the outer periphery of adjacent cells, means for inflating the individual cells and maintaining the cells inflated independently of each other, and said inner and outer webs connecting the separate cells to form a single unit and control the expansion of the cells away from each other.*

References Cited in the file of this patent or the original patent

UNITED STATES PATENTS

| | | |
|---|---|---|
| 2,001,384 | Garvey | May 14, 1935 |
| 2,114,301 | Harrigan | Apr. 19, 1938 |
| 2,451,474 | Craig | Oct. 19, 1948 |
| 2,621,342 | Boyle | Dec. 16, 1952 |
| 2,623,574 | Damsch | Dec. 30, 1952 |
| 2,774,979 | Moran | Dec. 25, 1956 |

FOREIGN PATENTS

| | | |
|---|---|---|
| 690,523 | Great Britain | Apr. 22, 1953 |